United States Patent [19]
Rust

[11] 4,040,411
[45] Aug. 9, 1977

[54] APPARATUS FOR CONCENTRATION OF SOLAR RADIATION

[76] Inventor: Rudolph Rust, 4562 Heil, Apt. 3, Huntington Beach, Calif. 92649

[21] Appl. No.: 612,106

[22] Filed: Sept. 10, 1975

[51] Int. Cl.$^2$ ............................................ F03G 7/02
[52] U.S. Cl. ................................... 126/271; 350/293
[58] Field of Search .................. 126/270, 271; 264/1; 350/293, 295, 178, 310

[56] References Cited

U.S. PATENT DOCUMENTS

| 1,678,711 | 7/1928 | Shipman | 34/93 |
| 2,647,434 | 8/1953 | Zobel et al. | 350/295 |
| 3,274,301 | 9/1966 | Kulp, Jr. | 264/1 |
| 3,892,433 | 7/1975 | Blake | 126/270 |
| 3,905,352 | 9/1975 | Jahn | 126/271 |

OTHER PUBLICATIONS

Journal of the Optical Society of America, vol. 48, No. 7, July 1958, pp. 480–482, "Free Surface of Liquids as an Optical Element."

Primary Examiner—John J. Camby
Assistant Examiner—Larry I. Schwartz

[57] ABSTRACT

An apparatus for the concentration of solar radiation to a utilizable flux by directing it vertically downward upon the reflecting surface of a rotating liquid and utilizing the concentrated radiation at or near the focal point of the resulting optical system comprised of the combination of the paraboloid of revolution at the rotating surface of liquid, the reflecting plane surfaces used to direct the suns rays vertically downward, and shaped reflectors which may be used to direct the concentrated radiation to a radiation to enthalpy heat exchanger.

3 Claims, 5 Drawing Figures

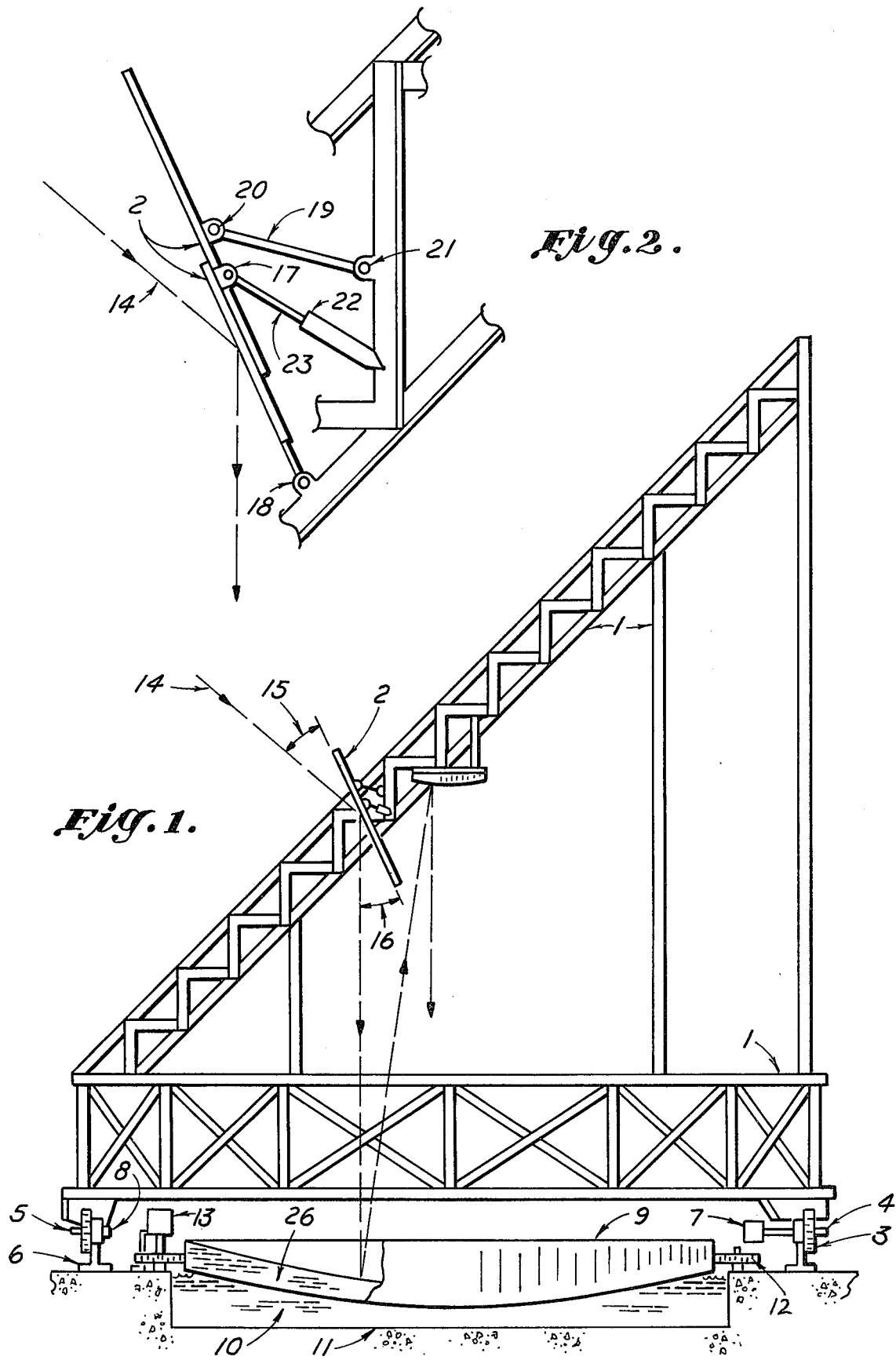

APPARATUS FOR CONCENTRATION OF SOLAR RADIATION

BACKGROUND OF THE INVENTION

Maximum intensity of solar radiation normal to the suns rays is not much above 300 Btu per hour per square foot. The average is much less than this. It is a fundamental fact of heat utilization known from Carnot's explanation of the limits of heat engines that low intensity heat energy is economically useless. Thus, all attempts to utilize solar energy without preconcentration thereof are doomed to economic failure.

It is well known to the art that all rays of radiant energy directed toward the reflecting surface of a paraboloid with basic parabolic curve defined by the equation:

$$X^2 = 4PY$$

come to a focal point. In this equation "$Y$" is the distance of a given point on the curve from the axis which is parallel to the incident vertical rays and "$X$" is the distance from this point to the nose of the parabola, when measured parallel to the "$X$" axis. The focal point of the parabola is on the "$Y$" axis at a distance "$P$" from the nose of the parabola.

It is also well known that in a gravity field a surface of a rotating liquid is a paraboloid of revolution defined by the equation:

$$Y = (\tfrac{1}{2}g) W^2 X^2$$

In this equation "$Y$" and "$X$" are as defined previously and "$W$" is the angular velocity, and $g$ is the well known gravitational constant.

In the prior art parabolic reflectors have been used to concentrate radiant energy at the focal point by mounting them upon a superstructure capable of following the sun so the necessary parallelism of radiation to the paraboloid's axis could be maintained; however, manufacturing and structural limitations have precluded use of a paraboloid of sufficient size to produce enthalpy in a quantity suitable for commercial utilization.

SUMMARY OF THE INVENTION

It is the principal object of the present invention to overcome the manufacturing, structural, and size limitations of such a system by utilizing an unlimited in size, simple, relatively inexpensively constructed reflecting paraboloid of revolution comprising a rotating fluid surface.

It is also an object of this invention to provide a combination of said reflecting paraboloid of revolution and an apparatus for efficiently directing the suns rays vertically down upon it by means of variable area plane reflectors mounted upon a sun tracking mechanism, or gantry.

It is also an object of this invention to provide a combination of the above combination with a radiation absorption means for conversion of concentrated solar radiation into useful enthalpy.

DESCRIPTION OF DRAWINGS

For a better understanding of the invention reference may be had to the accompanying drawings.

FIG. 1 is an elevation view of the complete machine partially sectioned to show the exterior of the rotating vessel.

FIG. 2 is an enlarged sectional view of the plane reflectors used for directing the suns rays vertically downward.

DESCRIPTION OF THE PREFERRED EMBODIMENT

Figure 3:
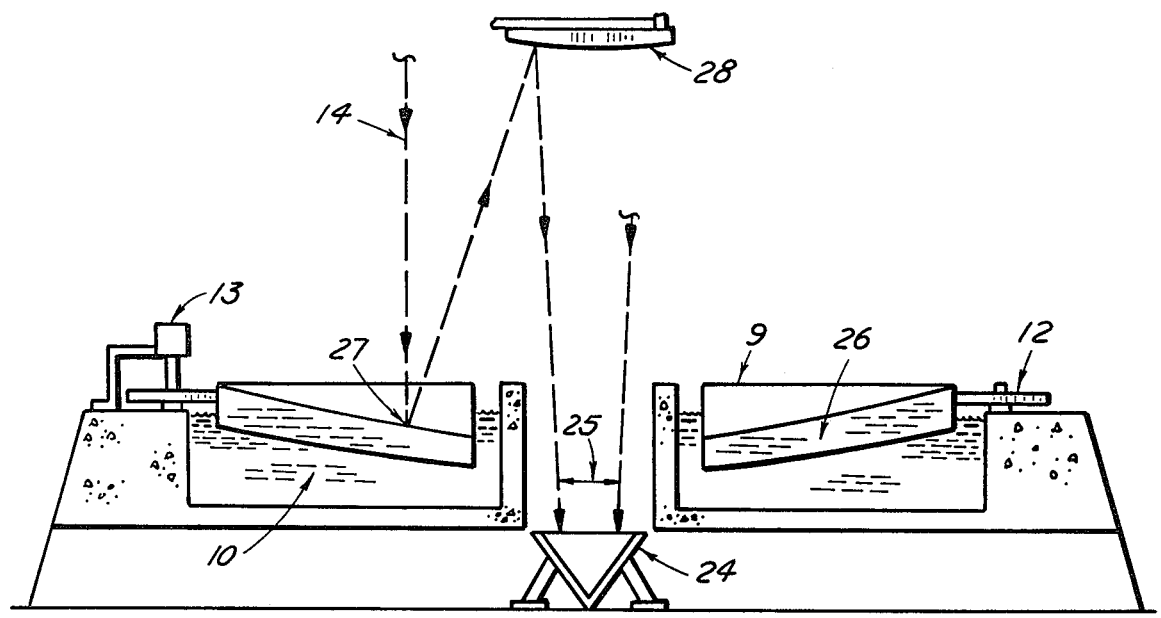
FIG. 3 is a sectional view through the rotating vessel showing the preferred location of the radiation to enthalpy converter.

In the preferred embodiment industrial amounts of steam are produced by the apparatus shown in FIGS. 1 thru 4. Basically these show a combination of a large parabolic mirror produced by floating a reflecting substance on a rotating liquid surface in a rotating vessel and a radiation to enthalpy exchanger at the focus of the optical system comprised of said combination, and an array of plane reflectors arranged to direct solar radiation vertically down onto the parabolic mirror.

FIG. 1 shows a gantry structure 1 upon which is mounted a multiplicity of adjustable reflecting planes 2. Said gantry structure 1 is mounted upon a multiplicity of flanged wheels 3 attached through journal bearings 4 and axles 5. Said flanged wheels 3 are arranged more or less at equal circumferential distances along a track 6 arranged in a circle such that the gantry structure 1 is restrained in all modes of motion except rotational about the center of said circular track 6.

The gantry structure 1 is used for slowly rotating the entire array of adjustable reflecting planes 2 in a circle. In order to cause this rotation and to control it one or more of the flanged wheels 3 is driven in a rotary motion by an electric motor 7. Feedback of the position of the gantry structure 1 in azimuth is obtained by selsyn transmitter 8 rotated by one of the axles 5. The electrical signal from the selsyn transmitter 8 is fed into a known to the art computer.

Although the preferred embodiment uses a known to the art selsyn transmitter 8 any other feedback means including human senses could be used to input the azimuth control means whether said means be human, computerized electronics, or other.

Concentric to said circuit track 6 and substantially covering the area directly below the array of adjustable reflecting planes 2 is a cylindrically sided vessel 9 floating upon a liquid pool 10 which is in basin 11. Said vessel 9 is held concentric to said circular track 6 by three or more horizontal rollers 12 bearing upon its side. One or more of said horizontal rollers 12 is driven in a rotary mode by motor 13. Thus, because the vessel 9 is floating it rotates on an axis concentric with the track 6.

As previously stated, the purpose of the rotating vessel 9 is to create a parabolic reflecting surface upon its contents. The reason for floating said vessel is to eliminate ripples on said surface. As long as the rotational angular velocity of the cylindrically sided vessel 9 is constant and vibrations are not transmitted, the parabolic surface will remain stable in a position of dynamic equilibrium. An optically, "perfect" parabolic surface is so obtained by rotating a circular vessel 9 of liquid at a constant angular velocity to produce a desired focal length.

In operation the gantry structure 1 rotates to follow the sun in azimuth and the adjustable reflecting planes 2 rotate horizontally and change in exposed area. In the preferred embodiment these motions are controlled by electric power which is in turn controlled by an electronic computer programmed to position the gantry and set the reflecting plane angle in accordance with astronomical determinations of the position of the sun. A typical ray 14 of the suns radiation always strikes the reflecting plane 2 in such a manner that the angle of incidence 15 always equals the angle 16 between the reflecting plane 2 and the vertical. The computer is also programmed to cause the adjustable reflecting planes 2 to change in exposed area so as to minimize the loss of coverage when the sun is near its zenith and also minimize the shading effect of adjacent reflector planes when the sun is near the horizon.

Human senses could of course replace any of the computer functions described above.

FIG. 2 is a detailed view of a typical assembly of adjustable reflecting planes 2. In the preferred embodiment two reflecting planes of any convenient length and width as shown are held together with slides 17 which restrain their relative motion in any direction except a parallel sliding motion in what can be best described as a telescoping assembly. The lower edge of the lower reflecting plane is attached to the structure by pivot 18. The upper half of the reflecting plane 2 is attached to the tension member 19 by the pivot 20. The tension member 19 is attached to the structure by the pivot 21. The hydraulic actuator cylinder 22 is mounted upon the lower reflecting plane 2 while the hydraulic actuator piston rod 23 is attached to the upper reflecting plane 2.

In the preferred embodiment reflecting planes 2 are silver plated steel; however, any rigid reflective material can be used.

It will be seen from examination of FIG. 2 that as the hydraulic actuator piston rod 23 extends, the reflecting planes 2 slide over each other thus increasing the reflector area. It will also be seen that as this action extends the upper reflecting plane 2 the tension member 19 must rotate in such a manner as to pull the entire reflecting plane assembly into a new angle closer to the vertical. It will also be seen that contracting the hydraulic actuator piston rod 23 will have the reverse effect.

The extension and retraction of the hydraulic actuator piston rod 23 is accomplished by pumping hydraulic fluid from one end of the hydraulic actuator cylinder 22 to the other end using hydraulic equipment commercially available. The arrangement of equipment for this purpose is well known to the art, as is the method of directing it from either manual or computer input.

The number of telescoping reflecting planes 2 and the relative lengths and locations of tension members 19 for optimum function depends upon the latitude on the earths surface at which the apparatus will be located and the value of lost radiation when the sun is near its zenith in proportion to the cost of the structure. The required mathematics and sun positions are well known to the arts of navigation and astronomy.

In the preferred embodiment for use north of latitude 45 deg N or south of latitude 45 deg S the reflecting plane 2 assembly is built to operate at 40 deg from the vertical to start operation shortly after sunrise and double its area at the angle where some radiation starts to pass through the array of reflecting planes 2. This provides maximum heat recovery in the winter when it is more likely to be required and accept the necessary partial loss of mid-day summer radiation.

FIG. 3 is a cross sectional view of the rotating floating vessel 9 showing the radiation to enthalpy exchanger 24 and means of directing concentrated radiation 25 from the focal point area to said equipment. From FIG. 2 it will be seen that as solar radiation strikes reflecting plane 2 it is directed vertically down onto the contents of the vessel 9.

This vessel 9 contains a liquid 26 upon which is floated a particulate reflecting material 27. In the preferred embodiment the liquid 26 is water and the particles of reflecting material 27 comprise ½ inch diameter, by 0.005 inch thick aluminum foil particles. These discs float on a water or liquid surface comprised of glycol, glycerine, or both due to their natural resistance to being wetted.

As previously pointed out the rotation of the floating vessel 9 causes the surface of its liquid 26 contents to assume the shape of a paraboloid of revolution. Thus, all of the solar radiation directed downward by the reflectors 2 will be either absorbed by the rotating liquid 26 or be reflected toward the focus of the paraboloid of revolution.

Using the said preferred particulate reflecting material 27, the absorbed radiation will not exceed ten percent of the total. This will normally dissipate into the surrounding atmosphere by convection and radiation.

Although the radiation to enthalpy exchanger 24 could be located at the focal point of the paraboloid of revolution in the preferred embodiment the radiation is reflected by a second focal point reflector 28 to the focal point where the radiation to enthalpy exchanger 24 is located below the structure foundation for easier support and service.

Said focal point reflector 28 is cooled internally by a continuous circulation of fluid from an external heat exchanger of standard commercial availability. The shape of said focal point reflector is such that its angle at any point is perpendicular to the bisector of the angle made by a striking ray and the vertical. In the preferred embodiment the bottom of said focal point reflector 28 is polished aluminum; however, any other reflecting material could be used.

Figure 4:
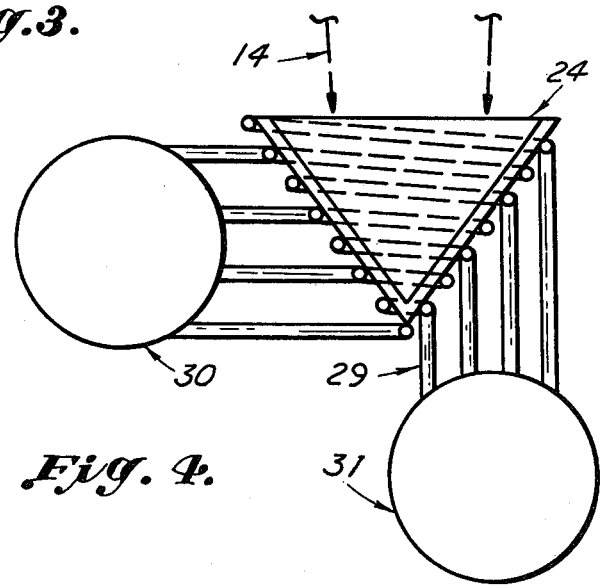
FIG. 4 is a diagramatic view of the preferred embodiment of radiation to enthalpy exchanger, comprised of a steam generator.

FIG. 4 shows the preferred radiation to enthalpy exchanger. This is basically a known to the art steam generator commonly used for the production of steam from hot gases and radiation produced by burning fuels. It is comprised of tubes 29, steam drum 30, and mud drum 31 arranged in a more or less standard boiler type assembly. The main difference is in the shape of the tubes 29 which are coiled in a conical shape necessary to trap the bundle of concentrated solar radiation created by the previously described equipment.

Figure 5:
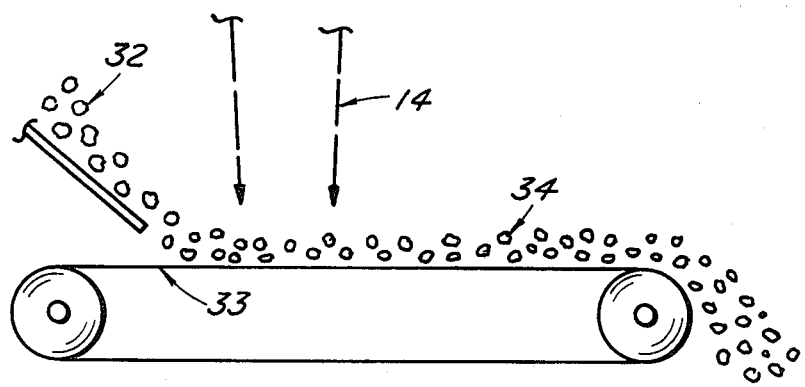
FIG. 5 is a diagramatic view of another embodiment wherein the radiation to enthalpy exchanger is an oil shale pyrolysis unit.

Another radiation to enthalpy exchanger within the contemplation of this invention is shown in FIG. 5, wherein the concentrated solar radiation impinges upon a moving bed of oil shale 32 while the resulting pyrolized and vaporized oil and gas is withdrawn thru ducts into a conventional petrochemical refinery well known to the art. In this embodiment the oil shale travels thru the concentrated radiation zone on a metal apron conveyor 33 the construction of which is well known in the ore dressing art. The speed of travel is regulated from pyrometer temperature sensor located to register the temperature of spent shale 34 as it leaves the radiation concentration zone. The optimum temperature for pyrolysis of shale oil is in the range of 900° F, varying slightly for various types of shale as known to the art of oil shale pyrolysis.

By substituting known to the art feed and discharge piping systems for the steam drum 30, and mud drum 31, as shown in FIG. 4; this invention can also be used to supply the heat to a liquid alkali metal heating system, a liquid salt heating system, and a liquid sodium carbonate heating system.

I claim:

1. An apparatus for converting solar radiation into high temperature heat energy wherein the solar radiation is directed vertically downward by means forming reflecting planes onto the surface of a fluid body rotating at constant angular velocity about its vertical axis; said reflecting planes being located upon a rotating gantry centered on the axis of the rotating fluid such that the rays reflected from the fluid surface are directed to another reflecting means located on said gantry so as to concentrate said rays upon a radiation to enthalpy exchanger located near means forming the focal point of said other reflecting means and wherein the reflectivity of the fluid is increased by a covering or partial covering of reflective particulate floating material, said gantry including means to enable said gantry to follow the sun in azimuth and upon which are mounted pivoted reflecting planes including means to enable said pivoted reflecting planes to follow the suns radiation in elevation to maintain the angle of incidence of the suns rays upon said rotating fluid surface equal to the angle between said surface and the vertical, and wherein the means for rotating the fluid is a mechanism which includes means to form a vessel containing a volume of fluid and having support means for rotating said vessel means about its' vertical axis, a multiplicity of wheels pressed substantially uniformly against the circumference of said vessel means; one or more of said wheels being rotated by a constant speed motor thus causing said vessel to rotate at constant revolutions per minute wherein said vessel support means is a fluid in a stationary tank, said fluid having a sufficient depth and density to float the rotating vessel means with its contents.

2. An apparatus according to claim 1 wherein the area of the pivoted reflecting planes is varied to suit the angle between the reflecting plane and the vertical, becomming longer as the angle decreases.

3. An apparatus according to claim 1 wherein the radiation to enthalpy exchanger is a tube and drum steam generator with tubes wound in the general shape of the focal point of the optical system.

* * * * *